United States Patent [19]
Scott

[11] Patent Number: 4,749,221
[45] Date of Patent: Jun. 7, 1988

[54] MOBILE MINI-WAREHOUSE SYSTEM

[76] Inventor: Samuel P. Scott, 505 Bent Tree, Blackshear, Ga. 31516

[21] Appl. No.: 19,979

[22] Filed: Feb. 27, 1987

[51] Int. Cl.$^4$ ............................................. B60R 7/27
[52] U.S. Cl. .................. 296/24 R; 296/181; 49/404
[58] Field of Search ............ 296/24 R, 24 B, 181; 49/404, 467

[56] References Cited

U.S. PATENT DOCUMENTS 3,089,313  5/1963  Fix ...................................... 296/24 R
4,099,764  7/1978  Ratliff ................................. 296/24 R
4,505,126  3/1985  Jones et al. ........................ 296/24 R Primary Examiner—Robert R. Song
Attorney, Agent, or Firm—Louis T. Isaf

[57] ABSTRACT

A unique, portable, mini-warehouse system is defined comprising a plurality of side-by-side cubicles permanently mounted for mobility on a wheeled trailer frame; the mini-warehouse system being lowered to a ground access level for use as a temporary, multi-cubicle storage facility and being raised on wheels for travel on roadways; the mini-warehouse system being provided with a unique, leak-resisting doorway assembly (with threshold) to assist in preventing the entry of rainwater into the cubicles.

5 Claims, 2 Drawing Sheets

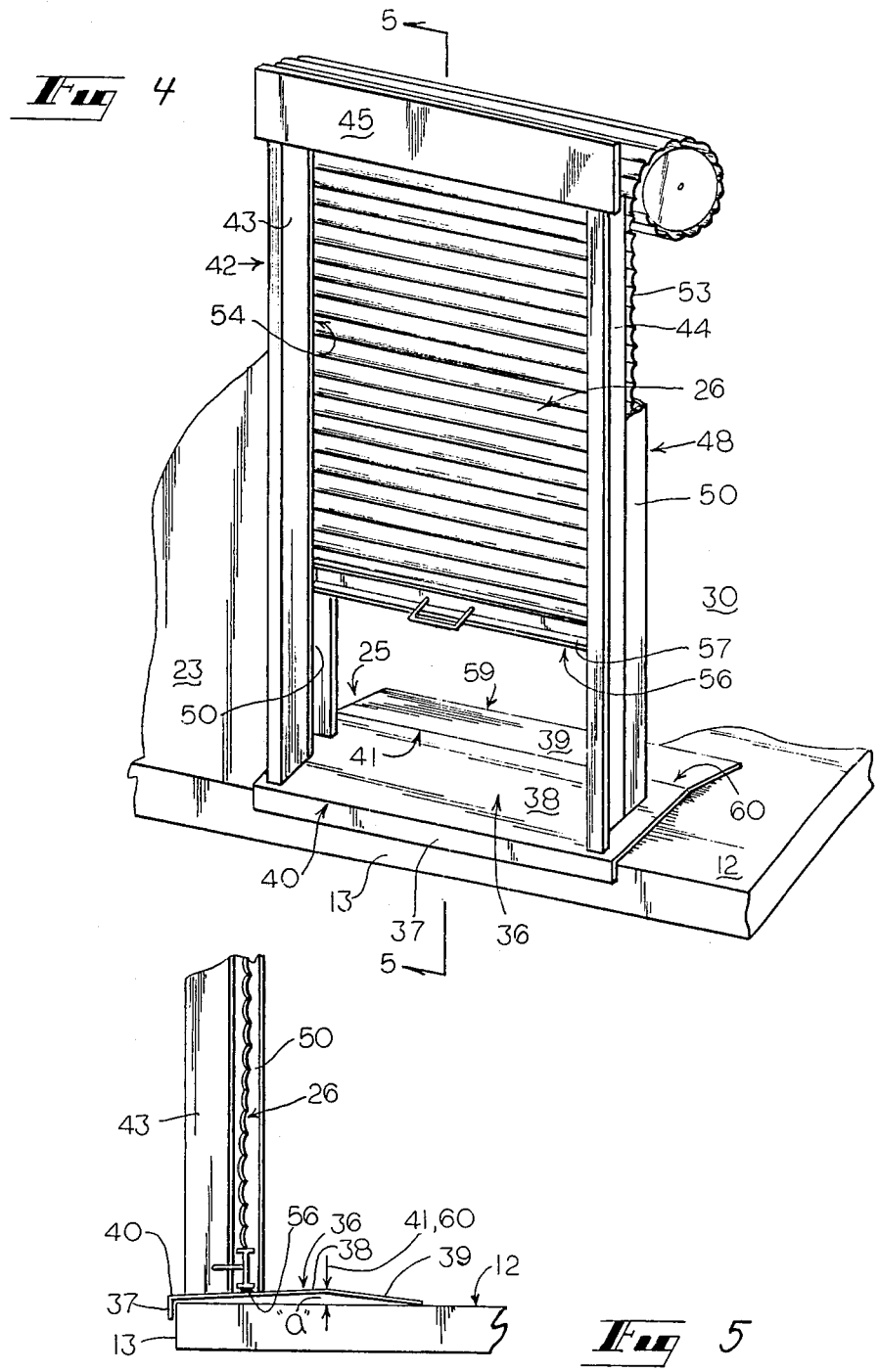

MOBILE MINI-WAREHOUSE SYSTEM

FIELD OF THE INVENTION

The present invention relates to the field of portable, premanufactured buildings.

BACKGROUND OF THE INVENTION

Over the past number of years, a great demand has arisen for mini-warehouses. These mini-warehouses are small, cubicle structures attached to oneother, side-by-side, in rows, on poured concrete slabs, each having their own door. A typical purpose is to provide individual, rentable storage space to a renting public. A problem in the industry, noted by the inventor of the present invention, is placement (that is, location) of the structures. It is desireable to have these mini-warehouses in areas accessible to the renting public. However, once a placement site is selected, area demographics will usually change, making the land of the placement site too valuable for use as a mini-warehouse. Consequently, the permanent warehouse structures must be removed—parts dismantled, concrete flooring and other parts destroyed—and the owner must re-construct at a different site, which new site is also subject to re-valuation. This is all accomplished at great expense, diminishing the investment return of the owners.

SUMMARY OF THE INVENTION

Briefly described, the present invention comprises a portable, mini-warehouse system which includes a plurality of cubicle structures, attached to one-another, side-by-side on a wheeled trailer unit. Each cubicle comprises a self-contained storage space which shares at least one wall with an adjoining cubicle. All cubicles share a common flooring member attached to the trailer bed which can be lowered to a ground access level and which can be raised for travel on roadways. All cubicles share a common roof member.

The doorway of each cubicle is covered by a door member granting access to the storage space. A unique threshold assembly overlays the floor at the doorway of each cubicle to assist in preventing the entry of rain water into the cubicle both while the system is set-up for storage use and while the system is being transported at high speeds on the highway.

Therefore, it is an object of the present invention to provide a mini-warehouse system that is portable and removable, while assembled, from one location to another.

Another object of the present invention is to provide a threshold assembly which lessens the need for a separate rain drainage system in front of the set-up mini-warehouse.

Yet another object of the present invention is to provide a unique doorway and threshold combination which assists in keeping the cubicle dry during transportation of the portable, mini-warehouse system.

Still another of the objects of the present invention is to provide a portable building structure which is transportable in rainstorms without the need for placing plastic coverings over doors and doorways.

Other objects, features and advantages of the present invention will become apparent upon reading and understanding this specification in light of the attached drawings.

BRIEF DESCRIPTION OF THE DRAWINGS

FIG. 4 is an isolated, pictorial view of the door and threshold assembly of the present invention.

FIG. 5 is an isolated side view of the door and threshold assembly of FIG. 4, viewed along line 5—5 of FIG. 4.

DETAILED DESCRIPTION OF THE PREFERRED EMBODIMENTS

Figure 1:
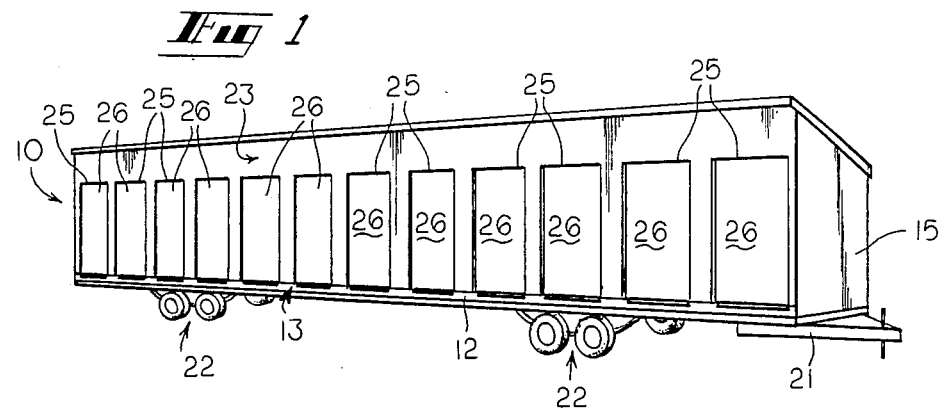
FIG. 1 is a pictorial view of a portable mini-warehouse, in accordance with the present invention.

Referring now in greater detail to the drawings in which the numerals represent like components throughout the several views, FIG. 1 shows the mobile mini-warehouse system 10 of the present invention. The system 10 is seen as including: a floor member 12, of which the front edge 13 is seen; an end wall 15, to which there is a similar, opposite end 16; a roof 17; and a trailer frame 20 on which the other elements are mounted. A trailer hitch 21 and wheels 22 are seen connected to the trailer frame 20. A front wall 23 is mounted along the front edge 13 of the floor member 12 and formed in the front wall are a plurality of doorways 25, each covered with a door 26.

Figure 2:
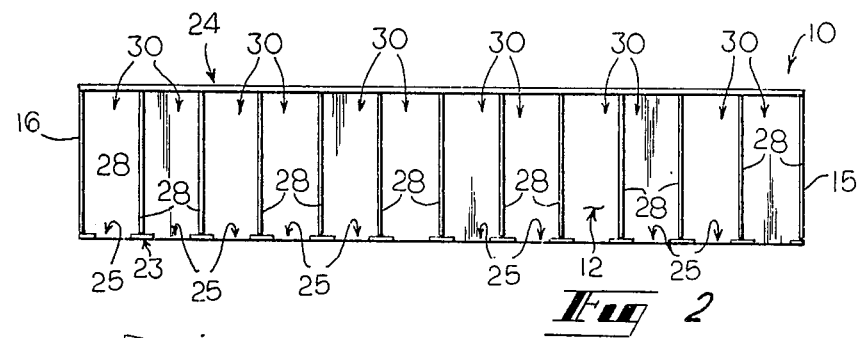
FIG. 2 is a floor plan of the mini-warehouse of FIG. 1.
Figure 3:
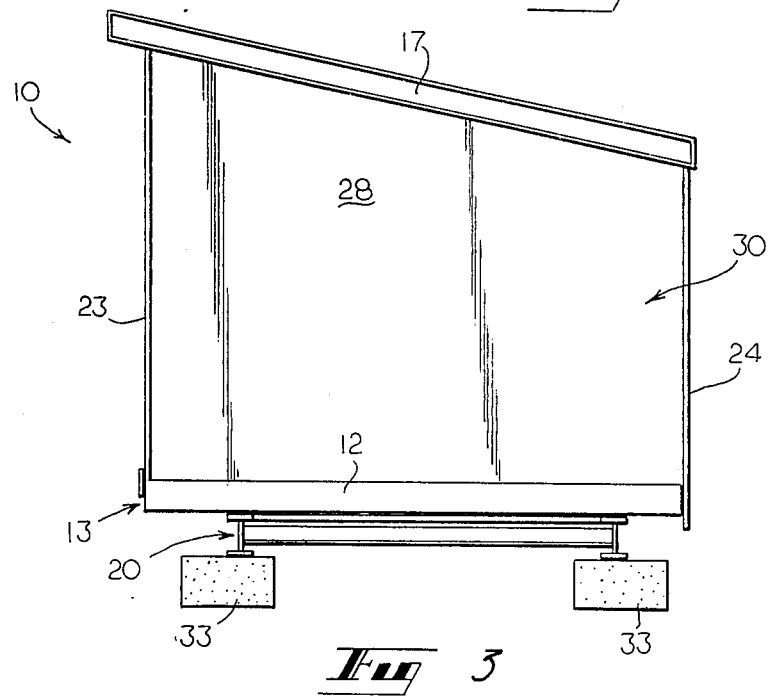
FIG. 3 is a cutaway, end view of the mini-warehouse of FIG. 1, shown set-up for storage use.

With reference to FIG. 2, the floor plan of the system 10 is seen which shows a plurality of parallel, divider walls 28 which are spaced apart along the floor member 12. The divider walls 28 extend between the rear wall 24 and front wall 23 of the system and extend from the floor member 12 to the roof 17. Each pair of adjacent divider walls defines a cubicle 30 which is accessible only through one of the doorways 25. These structural elements are seen, perhaps more clearly, in FIG. 3. FIG. 3 shows the system 10 with the wheels 22 removed and the frame 20 lowered to ground footings 33.

At each doorway 25, the system 10 is provided with a threshold assembly 36 (See FIGS. 4 and 5), which includes a lip member 37, first plate 38 and second plate 39. A door jam assembly 42 lines the boarder of each doorway 25 on the front wall 23. Each door jam assembly 42 includes two opposing door jambs 43, 44 and a header 45. Attached to the door jamb assemblies 42 at each doorway 25 is a door track assembly 48 to which is attached a door 24. Preferrably, the track assembly 48 includes trough-shaped tracks 50, 51 mounted upright on the back side of the jams 43,44, and the side edges 53, 54 of the door 26 travel within the tracks. In the preferred embodiments, the door 26 is an overhead, retractible door which glides up and down along the track assembly 48 behind the door jamb assembly 42. A rubber sealing strip 56 is attached along the entire bottom edge 57 of the door 26.

Also, in the preferred embodiment, there is a separate threshold assembly 36 for each doorway 25. The treashold assembly 36 is only slightly wider than the doorway 25 opening. The lip member 37 protrudes downward from one edge 40 of the first plate 38 such that the lip overhangs the front edge 13 of the floor member 12. The lip member 37 is used to position the threshold assembly 36 after which the lip is bolted in place to the floor 12. At the rear edge 41 of the first plate 38, the second plate 39 is joined to the first along a miter joint 60 defining an obtuse angle. Thus, when placed on the flat floor member 12, the threshold assembly 36 defines a ramp-up and ramp-down threshold from the lip member 37 into the cubicle 30 storage area. It is preferred that, except for this threshold assembly 36, the floor of all cubicles 30 is flat. The door jambs 43, 44 rest toward the front edge 40 of the first plate 38 and directly on the first plate. As the door 26 is closed, the rubber sealing strip 56 rests along the inclined first plate 38.

The threshold assembly 36 functions, in conjunction with the door 26 and rubber sealing edge 56, to assist in preventing the entry of rain water to the cubicle 30 from along the floor of the doorway entry. The inclined first plate 38 directs water away from the cubicle doorway, while the reverse inclined second plate provides gradual return to the cubicle floor 12 to aid in loading, i.e. with a hand truck. The preferred design of the door track assembly 48 also assists in preventing the entry of rainwater to the cubicle 30 from along the side edges 53, 54 of the door 26.

In a specific example of the preferred threshold assembly 36, the threshold assembly is approximately ten inches deep from the lip member 37 to the back edge 59 of the second plate 39. The first plate 38 is six inches deep from front edge 40 to rear edge 41; the second plate 39 is four inches deep and the incline rises to a height ("a") of one-half (½) inch above the flat floor member 12 at the miter joint 60. Whereas, these specifications change in different embodiments, it is preferred that the incline height of one-half inch be maintained even if the plates 38, 39 are made narrower.

With the mobile mini-warehouse system 10 completely assembled upon the wheeled, trailer frame 20, the system is transported along roadways to a chosen set-up site. It is intended that, during transportation at highway speeds, in a rainstorm, the combination of the threshold assembly 36, door jamb assembly 42, track assembly 48 door 26 and sealing strip 56 will keep the cubicles 30 acceptably dry. Upon reaching the set-up site, the wheels 22 are removed and the frame 20 is lowered to the ground surface, preferably placed on ground footings 33, after which access to each cubicle 30 is separately and independantly attained through one door 26 for storage of objects. It is intended that the threshold assembly 36 and associated structures will minimize the need for concrete entry pads and extra, exterior drainage channels at the set-up site. When it is desired to move the warehouse system 10, the frame 20 is raised, the wheels 22 attached, the doors 26 closed and the system pulled by roadway to the next site.

Whereas, this invention has been described in detail with particular reference to preferred embodiments thereof, it will be understood that variations and modifications can be effected within the spirit and scope of the invention, as described before and as defined in the appended claims.

I claim:

1. A portable building structure, comprising:
   a trailer frame;
   a flooring member mounted to said trailer frame;
   a plurality of cubicle structures supported on said flooring member, each said cubicle structure including at least one doorway;
   a threshold member overlaying said flooring member at said doorway of each said cubicle, said threshold member including a lip element overhanging one edge of said flooring member, a first plate attached to said lip element and a second plate attached to said first plate, said first plate and said second plate defining an obtuse angle by their connection, said first plate sloping from said one edge of said flooring member upward, away from said flooring member and said second plate sloping from said first plate downward to said flooring member;
   a door jamb lining said doorway of each said cubicle, said door jamb extending above the first plate of said threshold; and
   door means for closing off each said doorway.

2. Building structure of claim 1, wherein said door means comprises a vertically moving door, said door including a lower edge, upper edge and two opposing side edges, tracking assembly within which said door moves to raise and lower said door, and a seal element attached along said lower edge of said door, which seal element contacts said first plate of said threshold when said door is lowered, whereby the threshold, door jamb, tracking assembly, seal element and door edges all combine to resist entry of water into the cubicle structure.

3. Building of claim 1, further comprising detachable wheels mounted to said trailer frame.

4. A portable warehouse structure, comprising:
   a trailer frame;
   a flooring member mounted to said trailer frame and including a back edge, front edge and two opposite side edges;
   a plurality of parallel, spaced apart walls supported on said flooring member;
   a rear wall mounted along said back edge of said flooring member and abutting each of said spaced apart walls;
   a front wall mounted along said front edge of said flooring member and abutting each said spaced apart wall;
   a roof member supported above said floor member by said rear and front walls;
   said plurality of spaced apart walls, said rear wall, said front wall and said roof member combining to define a plurality of side-by-side cubicles on said flooring member;
   a plurality of door openings formed in said front wall, each door opening providing access to one of said side-by-side cubicles;
   a door means associated with each door opening for selectively and independently closing off said door opening; and
   detachable wheels mounted to said trailer frame,
   whereby a portable, multi-cubicle warehouse structure is defined; and
   an anti-leak doorway assembly which comprises, at least: a plurality of threshold members, each said threshold member overlaying said flooring member at one said door opening, each said threshold member including a lip element overhanging one edge of said flooring member, a first plate attached to said lip element and a second plate attached to said first plate, said first plate and said second plate defining an obtuse angle by their connection, said first plate sloping from said one edge of said flooring member upward, away from said flooring member and second plate sloping from said first plate downward to said flooring member; and a plurality of door jambs, each said door jamb lining one said doorway, each said door jamb extending above the first plate of one said threshold.

5. Warehouse structure of claim 4, wherein each said door means comprises a vertically moving door, said door including a lower edge, upper edge and two opposing side edges, tracking assembly within which said door moves to raise and lower said door, a seal element attached along said lower edge of said door, which seal element contacts said first plate of said threshold when said door is lowered, whereby the threshold, door jamb, tracking assembly, seal element and door edges all combine to resist entry of water to said cubicle.

* * * * *